United States Patent
Pump et al.

(10) Patent No.: US 10,119,578 B2
(45) Date of Patent: Nov. 6, 2018

(54) VEHICLE DRIVELINE HAVING TORQUE TRANSFER DEVICE THAT IS OPERATED ON FLUID PRESSURE

(71) Applicant: American Axle & Manufacturing, Inc., Detroit, MI (US)

(72) Inventors: Christopher D. Pump, Macomb, MI (US); Charles G. Stuart, Rochester Hills, MI (US); John C. Hibbler, Lake Orion, MI (US); Chad Umscheid, Oxford, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 53 days.

(21) Appl. No.: 15/221,637

(22) Filed: Jul. 28, 2016

(65) Prior Publication Data
US 2016/0333945 A1 Nov. 17, 2016

Related U.S. Application Data

(63) Continuation of application No. PCT/US2014/070427, filed on Dec. 16, 2014.
(Continued)

(51) Int. Cl.
| | |
|---|---|
| *F16D 48/02* | (2006.01) |
| *F16D 25/0638* | (2006.01) |
| *F16D 48/06* | (2006.01) |
| *B60K 17/02* | (2006.01) |
| *B60K 17/348* | (2006.01) |
| *F16D 13/52* | (2006.01) |
| *F16H 48/08* | (2006.01) |

(52) U.S. Cl.
CPC .......... *F16D 25/0638* (2013.01); *B60K 17/02* (2013.01); *B60K 17/348* (2013.01);
(Continued)

(58) Field of Classification Search
None
See application file for complete search history.

(56) References Cited

U.S. PATENT DOCUMENTS

| | | | |
|---|---|---|---|
| 4,679,463 A | 7/1987 | Ozaki et al. | |
| 4,799,160 A * | 1/1989 | Arbeille | ............... F16D 48/066 192/3.58 |

(Continued)

FOREIGN PATENT DOCUMENTS

| | | |
|---|---|---|
| EP | 1694546 A1 | 8/2006 |
| SU | 109483 A1 | 11/1956 |

(Continued)

OTHER PUBLICATIONS

Industrial Excess Flow Valves—Swagelok dated Nov. 2008.
(Continued)

*Primary Examiner* — Robert W Hodge
*Assistant Examiner* — Ryan P Dodd
(74) *Attorney, Agent, or Firm* — Harness, Dickey & Pierce, P.L.C.

(57) ABSTRACT

A vehicle driveline having a torque transfer device and a fluid circuit for operating the torque transfer device. The fluid circuit has a motor, a pump driven by the motor, an actuator, and a pair of valves. The valves are arranged in the fluid circuit to control fluid circulation within the fluid circuit and can be operated such that fluid pressure in the actuator can be maintained (i.e., to maintain engagement of the torque transfer device) without operating the pump.

7 Claims, 6 Drawing Sheets

Related U.S. Application Data

(60) Provisional application No. 61/934,129, filed on Jan. 31, 2014.

(52) U.S. Cl.
CPC ............. *F16D 13/52* (2013.01); *F16D 25/14* (2013.01); *F16D 48/02* (2013.01); *F16D 48/066* (2013.01); *F16H 48/08* (2013.01); *F16D 2048/0266* (2013.01); *F16D 2048/0272* (2013.01)

(56) References Cited

U.S. PATENT DOCUMENTS

| | | | | |
|---|---|---|---|---|
| 5,630,316 | A | * | 5/1997 | Itsuji ..................... F15B 1/165 60/418 |
| 5,709,627 | A | | 1/1998 | Teraoka |
| 7,059,460 | B2 | * | 6/2006 | Duan ................... F16D 25/123 192/70.12 |
| 7,954,318 | B2 | * | 6/2011 | Pritchard .............. F15B 21/044 60/545 |
| 8,403,119 | B2 | * | 3/2013 | Gerundt ................. F16D 48/02 192/48.601 |
| 2009/0038908 | A1 | * | 2/2009 | Quehenberger .... F16D 25/0638 192/85.32 |

FOREIGN PATENT DOCUMENTS

| | | |
|---|---|---|
| SU | 992254 A1 | 1/1983 |
| SU | 1079483 A1 | 3/1984 |
| SU | 1253850 A1 | 8/1986 |
| SU | 1298102 A1 | 3/1987 |
| WO | WO-2005/063542 A1 | 7/2005 |

OTHER PUBLICATIONS

PCT International Search Report dated Mar. 26, 2015.
Chinese Office Action dated Jan. 3, 2018 with English translation (corresponding to Chinese Application No. 201480076094.9).

* cited by examiner

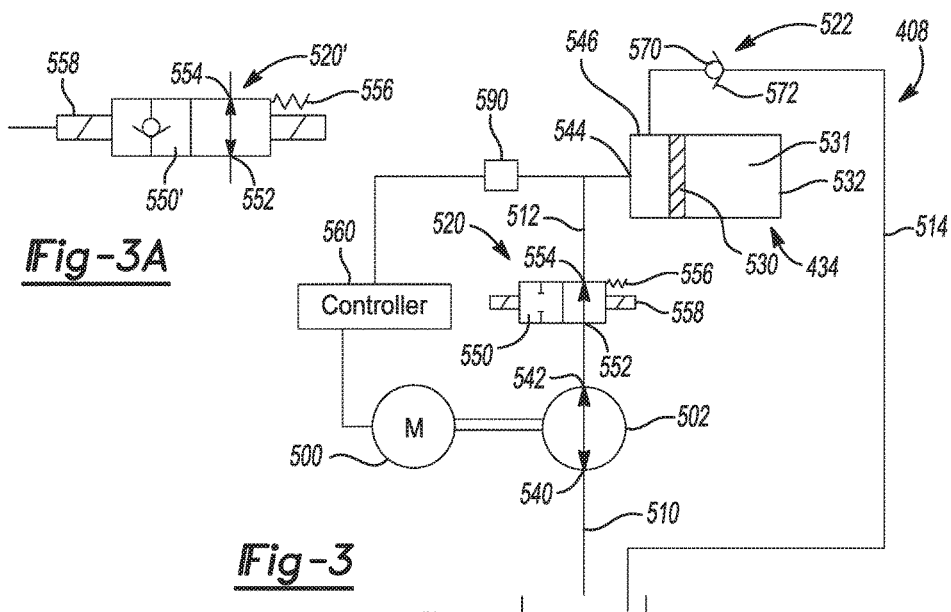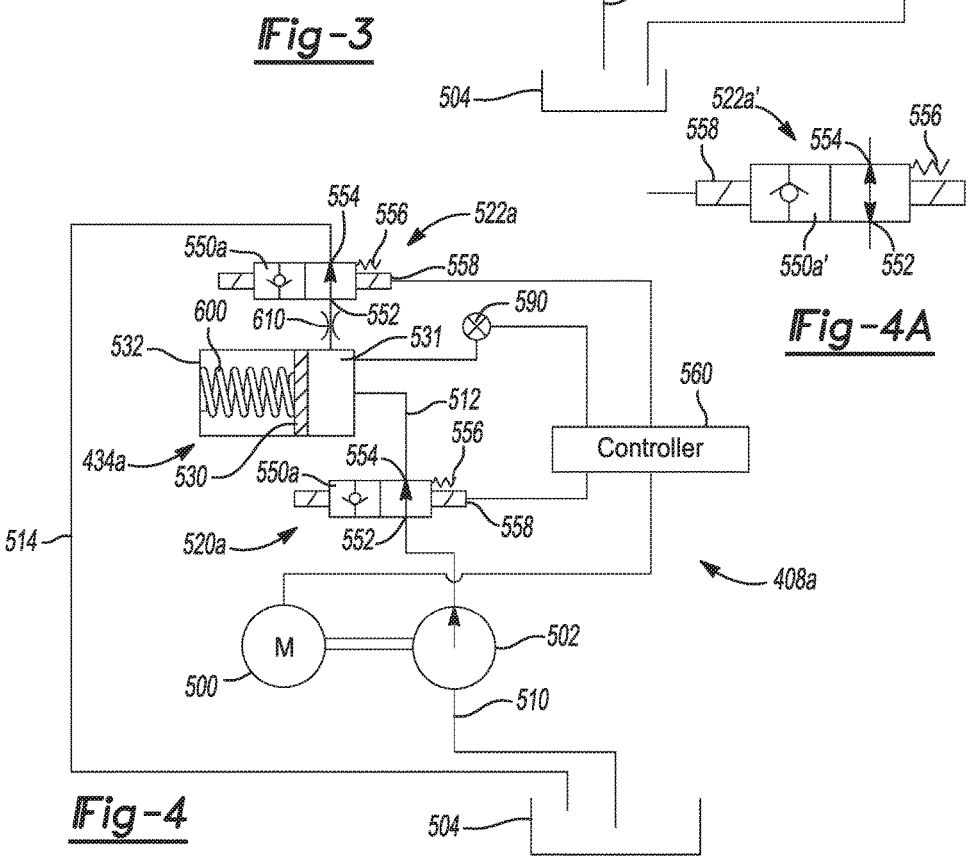

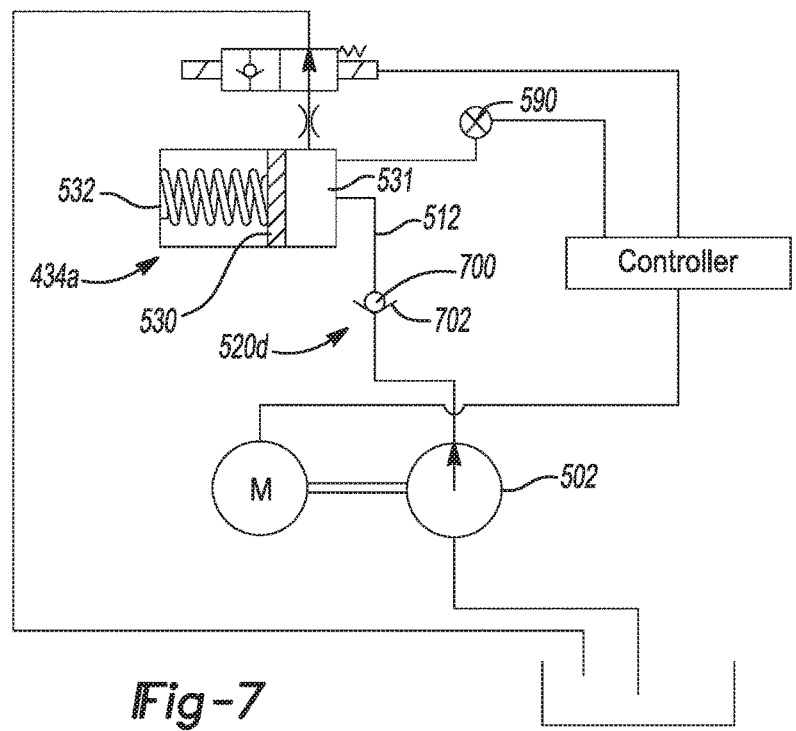
_Fig-7_
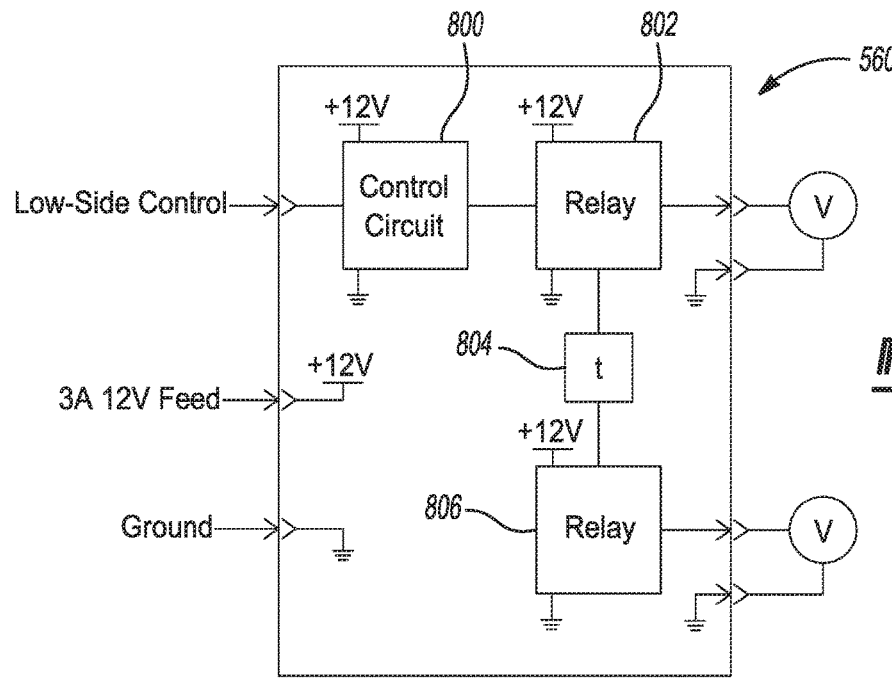
_Fig-8_

VEHICLE DRIVELINE HAVING TORQUE TRANSFER DEVICE THAT IS OPERATED ON FLUID PRESSURE

CROSS-REFERENCE TO RELATED APPLICATIONS

This application is a bypass continuation of PCT International Application No. PCT/US2014/070427 filed Dec. 16, 2014, which claims the benefit of U.S. Provisional Application No. 61/934,129 filed Jan. 31, 2014. The entire disclosure of each of the above applications is incorporated by reference as if fully set forth in detail herein.

FIELD

The present disclosure relates to a vehicle driveline having a torque transfer device that is operated on fluid pressure.

BACKGROUND

This section provides background information related to the present disclosure which is not necessarily prior art.

It is known in the art to provide a vehicle driveline having a torque transfer device whose operation is controlled by fluid pressure acting on the torque transfer device. Fluid pressure for the torque transfer device is typically generated by a pump or compressor. One drawback of the known systems is that the pump or compressor remains in operation over the entire time that the torque transfer device is to be engaged (i.e., transmitting rotary power therethrough).

SUMMARY

This section provides a general summary of the disclosure, and is not a comprehensive disclosure of its full scope or all of its features.

In one form, the present teachings provide a vehicle driveline that includes a clutch, a reservoir, a hydraulic ram, first and second valves and a pump. The clutch has a plurality of first clutch plates and a plurality of second clutch plates that are interleaved with the first clutch plates. The reservoir is configured to hold hydraulic fluid. The hydraulic ram is coupled to the friction clutch and has a piston chamber and a piston that is movable in the piston chamber between a first position, which is retracted relative to the first and second clutch plates, and a second position in which the piston is extended toward the first and second clutch plates to a greater extent than when the piston is in the first position. The first valve is coupled for fluid communication with the piston chamber. The second valve is coupled for fluid communication with the piston chamber and the reservoir. The pump is configured to pump hydraulic fluid from the reservoir to the piston chamber via the first valve. The first valve is operable in a first position in which fluid communication is permitted between the pump and the piston chamber, and a second position in which fluid communication between the pump and piston chamber is prevented. The second valve is operable in a first position in which fluid communication is permitted between the piston chamber and the reservoir, and a second position in which fluid communication between the piston chamber and the reservoir is prevented. The second valve is configured to be in the first position when a pressure within the piston chamber is less than a predetermined pressure, and the second valve is configured to be in the second position when the pressure in the piston chamber is greater than the predetermined pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a schematic illustration of an exemplary fluid circuit constructed in accordance with the teachings of the present disclosure;

FIG. 3A is a schematic illustration of an alternative portion of the fluid circuit of FIG. 3;

FIG. 4 is a schematic illustration of a first alternative fluid circuit constructed in accordance with the teachings of the present disclosure;

FIG. 4A is a schematic illustration of an alternative portion of the fluid circuit of FIG. 4;

FIGS. 5 through 7 are schematic illustrations of alternative fluid circuits constructed in accordance with the teachings of the present disclosure;

FIG. 8 is a schematic illustration of a controller constructed in accordance with the teachings of the present disclosure.

Corresponding reference numerals indicate corresponding parts throughout the several views of the drawings.

DETAILED DESCRIPTION

Example embodiments will now be described more fully with reference to the accompanying drawings.

Figure 1:
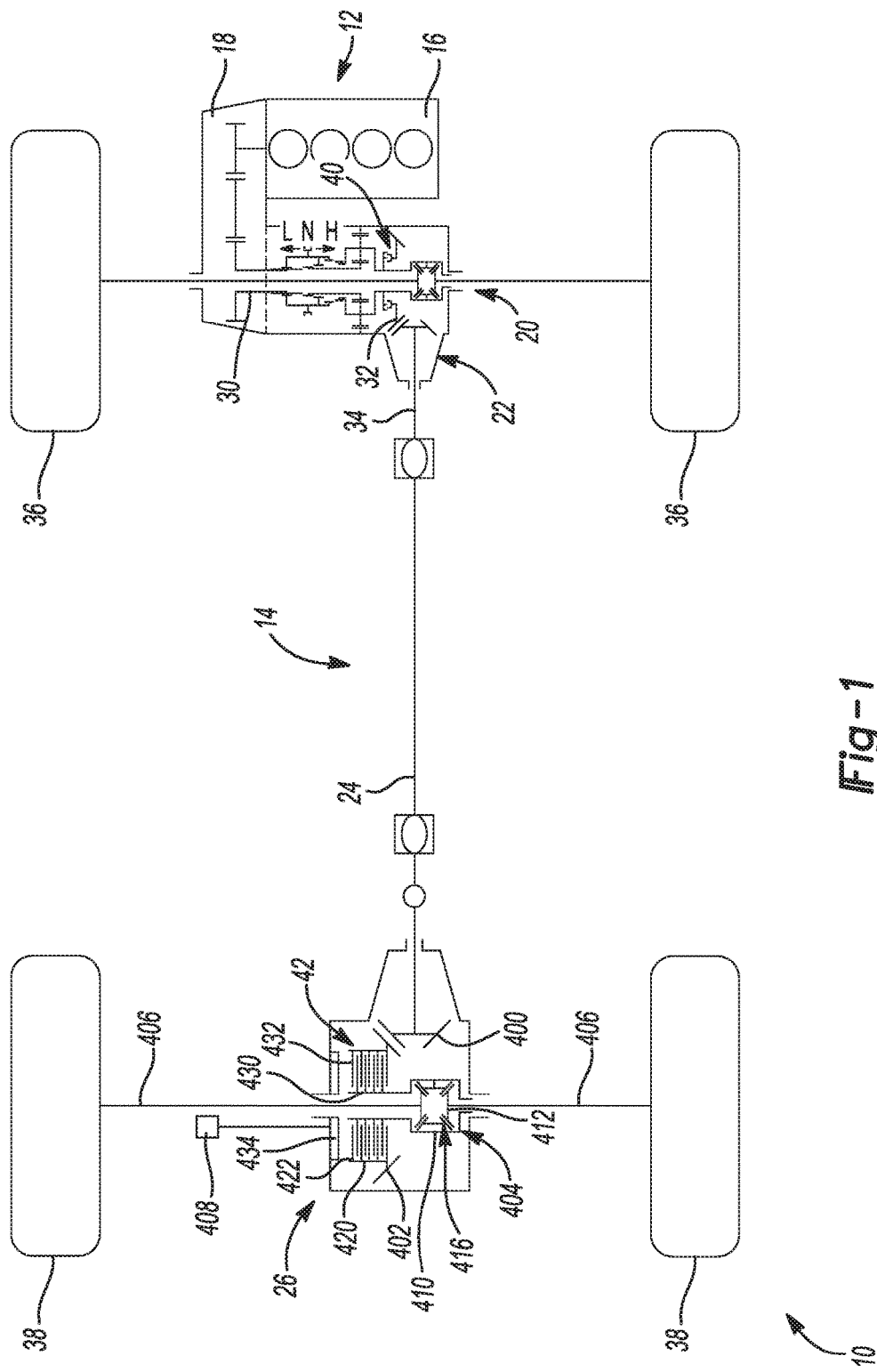
FIG. 1 is a schematic illustration of an exemplary vehicle having a vehicle driveline constructed in accordance with the teachings of the present disclosure.

With reference to FIG. 1 of the drawings, an exemplary vehicle having a driveline with a torque transfer device that includes a hydraulic circuit constructed in accordance with the teachings of the present disclosure is generally indicated by reference numeral 10. The vehicle 10 can have a powertrain 12 and a drive line or driveline 14. The powertrain 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the driveline 14. The transmission 18 can have a plurality of automatically or manually-selected gear ratios. The driveline 14 in the particular example provided is of an all-wheel drive configuration, but those of skill in the art will appreciate that the teachings of the present disclosure are applicable to other driveline configurations, including four-wheel drive configurations, rear-wheel drive configurations, and front-wheel drive configurations.

The driveline 14 can include a front axle assembly 20, a power take-off unit (PTU) 22, a prop shaft 24 and a rear axle assembly 26. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. It will be appreciated, however, that the driveline 14 could include one or more clutches to interrupt the transmission of rotary power through a part of the driveline 14. In the particular example provided, the driveline 14 includes a first clutch 40, which can be configured to interrupt the transmission of rotary power into or through the PTU 22, and a second clutch 42, which can be configured to interrupt the transmission of rotary power into or through components within the rear axle assembly 26.

A detailed discussion of the front axle assembly 20, the PTU 22 and the first clutch 40 is not pertinent to the torque transfer device and hydraulic circuit of the present disclosure and as such, need not be described in extensive detail herein as these components are described in detail in co-pending U.S. patent application Ser. No. 13/785,425 entitled "Two-Speed Disconnecting Driveline With One Reduction Gearset" filed Mar. 5, 2013, the disclosure of which is incorporated by reference as if fully set forth in detail herein.

Figure 2:
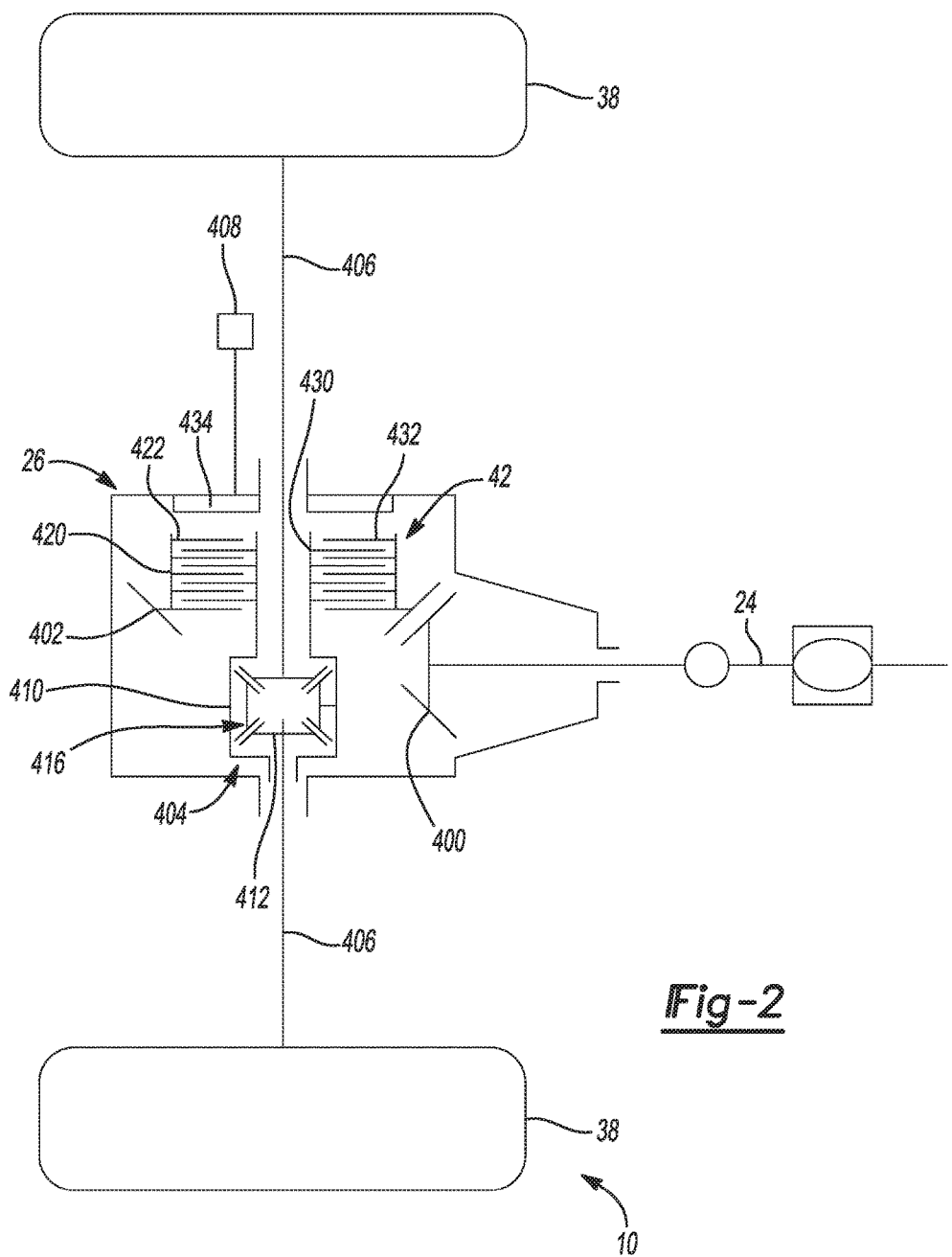
FIG. 2 is an enlarged portion of FIG. 1 illustrating a rear portion of the vehicle driveline in more detail.

With reference to FIG. 2, the rear axle assembly 26 can include an input pinion 400, a bevel ring gear 402, a second differential assembly 404, a pair of second shafts 406, the second (axle disconnect) clutch 42 and a hydraulic circuit 408. The input pinion 400 can be coupled to an end of the propshaft 24 for rotation therewith. The second bevel ring gear 402 being meshed with the input pinion 400. The second differential assembly 404 can be configured to receive rotary power transmitted through the second bevel ring gear 402 and can have a differential case 410, a pair of second output members 412 and a means for permitting speed differentiation between the second output members 412. In the example provided, the speed differentiation means comprises an open differential gearset 416 in which the second output members 412 are side gears. Each of the second shafts 406 can be coupled to a corresponding one of the second output members 412 for rotation therewith. The axle disconnect clutch 42 can be configured to selectively interrupt power transmission through the second differential assembly 404. The axle disconnect clutch 42 is a torque transfer device. The axle disconnect clutch 42 can be any type of clutch and can be mounted coaxially with the second differential assembly 404. In the particular example provided, the axle disconnect clutch 42 includes a clutch input member 420 that is coupled to the bevel ring gear 402 for rotation therewith, a plurality of first friction plates 422 that are non-rotatably coupled to the clutch input member 420, a clutch output member 430, which is non-rotatably coupled to the differential case 410, a plurality of second friction plates 432, which are non-rotatably coupled to the clutch output member 430, and an actuator 434, which can be an element of the hydraulic circuit 408. The first and second friction plates 422 and 432 can be interleaved and the actuator 434 can be employed to compress the first and second friction plates 422 and 432 so that they frictionally engage one another so that rotary power can be transmitted from the bevel ring gear 402 through the axle disconnect clutch 42 and to the differential case 410. When the actuator 434 is disengaged so that rotary power is not transmitted through the axle disconnect clutch 42, the rear wheels 38 will drive the second output members 412, but the axle disconnect clutch 42 inhibits the transmission of rotary power into the bevel ring gear 412 that would cause the bevel ring gear 412 to correspondingly rotate. In this way, operation of the vehicle 10 (FIG. 1) in a front-wheel drive mode will not permit the rear wheels 38 to "back drive" the bevel ring gear 402.

In FIG. 3, the hydraulic circuit 408 is schematically illustrated as including a motor 500, a pump 502, a hydraulic reservoir 504, the actuator 434, a first fluid conduit 510, a second fluid conduit 512, a third fluid conduit 514, a first valve 520, and a second valve 522. The motor 500 can be any desired motor, such as a reversible DC electric motor that can be powered by the electrical system of the vehicle 10 (FIG. 1). The pump 502 can be any type of fluid pump, such as a reversible gerotor pump. The hydraulic reservoir 504 can be configured to hold a quantity of suitable hydraulic fluid. The actuator 434 can be a single-acting hydraulic cylinder having a piston 530 that can be moved in a piston chamber 531 disposed in a hollow cylindrical housing 532 to cause engagement/disengagement of the first and second friction plates 422 and 432 (FIG. 2). The actuator 434 may optionally include a spring (not shown) that can bias the piston 530 in a predetermined direction, such as in a direction that corresponds to disengagement of the first and second friction plates 422 and 432 (FIG. 2). The first fluid conduit 510 can couple the hydraulic reservoir 504 and a first inlet/outlet 540 of the pump 502 in fluid communication. The second fluid conduit 512 can couple a second inlet/outlet 542 of the pump 502 and an inlet 544 of the housing 532 of the actuator 434 in fluid communication. The third fluid conduit 514 can couple the outlet 546 of the housing 532 of the actuator 434 and the hydraulic reservoir 504 in fluid communication. The first valve 520 can be disposed along the second fluid conduit 512 between the pump 502 and the actuator 434, while the second valve 522 can be disposed along the third fluid conduit 514 between the actuator 434 and the hydraulic reservoir 504. The outlet 546 provides fluid communication from the actuator 434a to the third fluid conduit 514. The outlet 546 can also provide a restriction to the hydraulic flow from the actuator 434 through the third fluid conduit 514, allowing hydraulic pressure to build in the actuator 434 as the incoming hydraulic fluid flow through inlet 544 exceeds the outgoing hydraulic fluid flow through outlet 546.

Operation of the first and second valves 520 and 522 can be coordinated in a first mode of operation that permits bidirectional fluid communication through the second fluid conduit 512 between the pump 502 and the actuator 434 and through the third fluid conduit 514 between the actuator 434 and the hydraulic reservoir 504, with a restriction at outlet 546. Operation of the first and second valves 520 and 522 can be coordinated in a second mode of operation that inhibits fluid communication through the third fluid conduit 514 between the actuator 434 and the hydraulic reservoir 504 and permits fluid communication through the second fluid conduit 512 between the pump 502 and the actuator 434. Operation of the first and second valves 520 and 522 can be coordinated in a third mode of operation that inhibits fluid communication through the third fluid conduit 514 between the actuator 434 and the hydraulic reservoir 504 and inhibits fluid communication through the second fluid conduit 512 between the pump 502 and the actuator 434.

Operation of the first and second valves 520 and 522 in the first mode can be employed when the pump 502 is operated to provide pressurized fluid to the actuator 434 (i.e., to compress the first and second friction plates 422 and 432 (FIG. 2) to thereby engage the axle disconnect clutch 42), or to withdraw fluid from the actuator 434 (i.e., to separate the first and second friction plates 422 and 432 (FIG. 2) to thereby disengage the axle disconnect clutch 42). Operation of the first and second valves 520 and 522 in the second mode can be employed to increase fluid pressure to the actuator 434 (i.e., to compress the first and second friction plates 422 and 432 (FIG. 2) to thereby modulate the axle disconnect clutch 42). Operation of the first and second valves 520 and 522 in the third mode can be employed to maintain fluid pressure in the actuator 434 at a desired level without corresponding operation of the pump 502. Accordingly, it will be appreciated that the first and second valves 520 and 522 can be operated in the first mode when the pump 502 is driven by the motor 500 to provide sufficient hydraulic (fluid) pressure to the piston 530 of the actuator 434 to engage the first and second friction plates 422 and 432 (FIG. 2) to a desired degree and that thereafter the first and second valves 520 and 522 can be operated in the second mode and the motor 500 can be turned off so that the pump 502 is not driven.

In the particular example provided, the first valve 520 is a solenoid-operated, two-way, two-position directional valve, and the second valve 522 is a type of check valve. The first valve 520 can include a valve body 550 that can be moved between a first position, which permits fluid flow between a first valve inlet/outlet 552 and a second valve inlet/outlet 554, and a second position that inhibits fluid flow between the first and second valve inlet/outlets 552 and 554. The first valve 520 can include a spring 556, which can bias the valve body 550 into a desired position, such as the first position, and a solenoid 558 that can be electrically coupled to a controller 560 and configured to selectively apply a force on the valve body 550 to cause the valve body 550 to move (e.g., to the second position). The second valve 522 could be a conventional check valve having a valve element 570 that can be moved relative to a valve seat 572 by hydraulic pressure. In the particular example provided, a spring (not shown) biases the valve element 570 away from the valve seat 572 so that the valve element 570 closes against the valve seat 572 when fluid pressure applied against the piston 530 in the hydraulic cylinder of the actuator 434 is greater than or equal to a predetermined pressure. It will be appreciated that the particular valve employed for the second valve 522 effectively establishes a bleed path in the hydraulic circuit 408 that permits air to be vented from the actuator 434. A pressure sensor 590 can be coupled to the actuator 434 to sense the pressure of the fluid in the housing 532 of the hydraulic cylinder that is applied against the piston 530 and produce a signal in response thereto. The controller 560 can receive the signal from the pressure sensor 590 and can responsively control the operation the motor 500 and the first valve 520.

An alternative first valve 520' is shown in FIG. 3A and can be substituted for the first valve 520 of FIG. 3. The first valve 520' can be a solenoid-operated, two-way, two-position directional valve that can include a valve body 550' that can be moved between a first position, which permits fluid flow between the first valve inlet/outlet 552 and the second valve inlet/outlet 554, and a second position that permits fluid flow from the first valve inlet/outlet 552 to the second valve inlet/outlet 554 but which inhibits fluid flow from the second fluid inlet/outlet 554 to the first valve inlet/outlet 552.

In FIG. 4, a first alternative hydraulic circuit 408a is illustrated. The actuator 434a includes a spring 600 that biases the piston 530 so that hydraulic fluid is urged out of the housing 532 of the hydraulic cylinder of the actuator 434a to separate the first and second friction plates 422 and 432 (FIG. 2) and thereby disengage the axle disconnect clutch 42 (FIG. 2). The first and second valves 520a and 522a are solenoid-operated, two-way, two-position directional valves having a valve body 550a, a spring 556 and a solenoid 558. The valve body 550a can be moved between a first position, which permits fluid flow between the first valve inlet/outlet 552 and a second valve inlet/outlet 554, and a second position that permits fluid flow in a forward direction but inhibits fluid flow in a reverse direction (as will be described in detail below). The spring 556 can bias the valve body 550a toward the first position and the solenoid 558 can be electrically coupled to a controller 560 and configured to selectively apply a force on the valve body 550a to cause the valve body 550a to move (e.g., to the second position). An optional flow valve 610, which can be formed as a small orifice, such as an orifice of 0.020 inch (0.5 mm), can be employed in the third fluid conduit 514 to meter fluid flow out of the housing 532 of the hydraulic cylinder. While the flow valve 610 is illustrated to be located between the second valve 522a and the actuator 434a in the particular example provided, it will be appreciated that the flow valve 610 could be located so as to receive fluid flow from the second valve inlet/outlet 554 of the second valve 522a (i.e., so that the second valve 522a is located between the flow valve 610 and the hydraulic cylinder).

In operation, the motor 500 can drive the pump 502 to apply fluid pressure to the piston 530 of the actuator 434a when the valve bodies 550a of the first and second valves 520a and 522a are in their first positions. When the pressure that acts on the piston 530 is greater than a predetermined threshold, the controller 560 can control the operation of the solenoids 558 to move the valve bodies 550a to their second positions. When the valve body 550a of the first valve 520a is in its second position, reverse fluid flow through the first valve 520a (i.e., fluid flow in the second fluid conduit 512 in a direction from the actuator 434a to the pump 502) is inhibited, but forward fluid flow through the first valve 520a (i.e., fluid flow in the second fluid conduit 512 from the pump 502 to the actuator 434a) is permitted. Similarly, when the valve body 550a of the second valve 522a is in its second position, reverse fluid flow through the second valve 522a (i.e., fluid flow in the third fluid conduit 514 in a direction from the hydraulic reservoir 504 to the actuator 434a) is inhibited, but forward fluid flow through the second valve 522a (i.e., fluid flow in the third fluid conduit 514 from the actuator 434a to the hydraulic reservoir 504) is permitted. It will be appreciated that the third valve 610, if present, will limit the flow of fluid exiting the actuator 434a.

An alternative second valve 522a' is shown in FIG. 4A and can be substituted for the second valve 522a of FIG. 4. The second valve 522a' can be a solenoid-operated, two-way, two-position directional valve that can include a valve body 550a' that can be moved between a first position, which permits fluid flow between the first valve inlet/outlet 552 and the second valve inlet/outlet 554, and a second position that inhibits fluid flow from the first valve inlet/outlet 552 to the second valve inlet/outlet 554 but which permits fluid flow from the second fluid inlet/outlet 554 to the first valve inlet/outlet 552.

Figure 5:
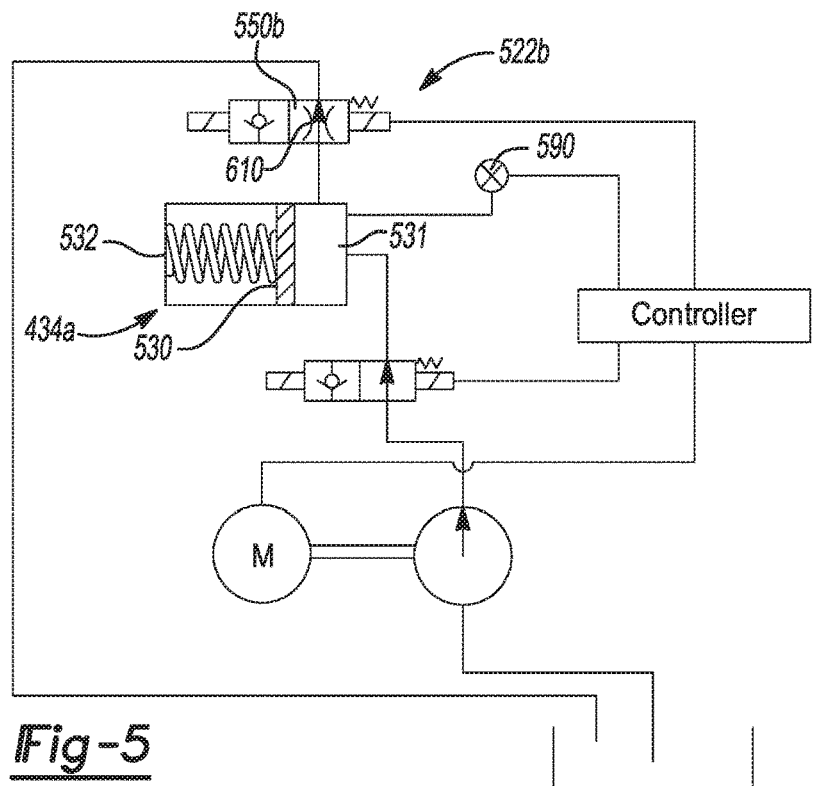

The example of FIG. 5 is generally similar to that of FIG. 4, except that the optional third valve (i.e., flow valve) 610 is incorporated into the second valve 522b so that the flow of fluid exiting the actuator 434a is limited by the flow valve when the valve body 550b of the second valve 522b is in the first position as shown in the figure. It will be appreciated that unlike the example of FIG. 4, the flow valve has no effect on the flow of hydraulic fluid when the valve body 550b of the second valve 522b is in its second position.

Figure 6:
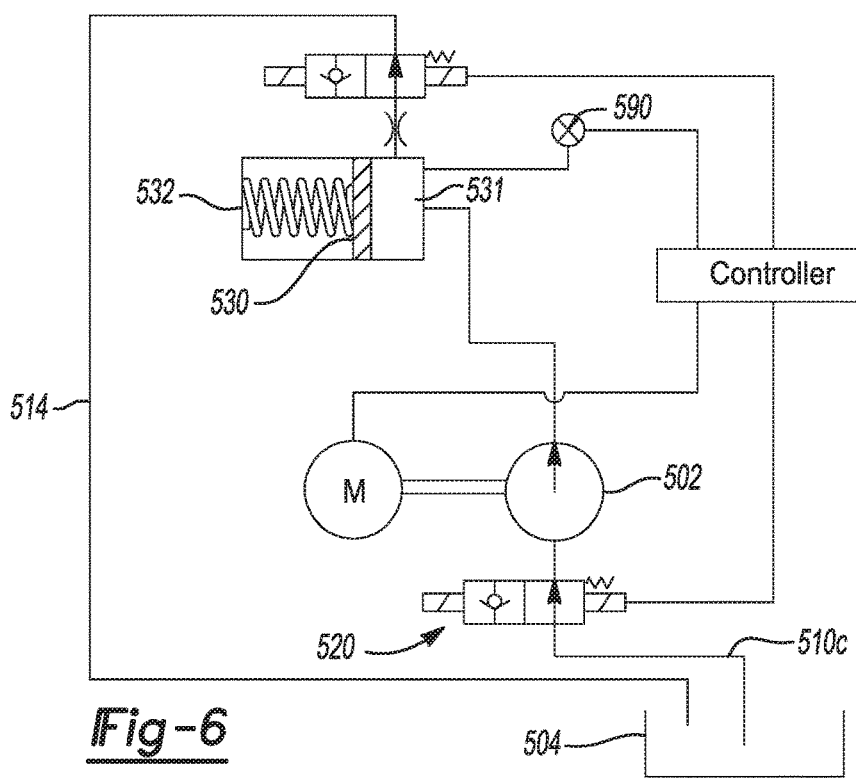

The example of FIG. 6 is generally similar to that of FIG. 4, except that the first valve 520 is disposed in the first fluid conduit 510c between the hydraulic reservoir 504 and the pump 502.

The example of FIG. 7 is generally similar to that of FIG. 4, except that the first valve 520d is illustrated to be a conventional check valve having a valve element 700 that can be moved relative to a valve seat 702 by hydraulic fluid flow. In the example provided, when the pressure of the hydraulic fluid exiting the pump 502 exceeds the pressure in the housing 532 of the hydraulic cylinder of the actuator 434a that acts on the piston 530, the valve element 700 can be moved (in response to the differential fluid pressure) away from the valve seat 702 to permit fluid flow from the pump 502 to the actuator 434a. When the pressure of the hydraulic fluid in the portion of the second fluid conduit 512 between the first valve 520d and the pump 502 is less than the pressure in the housing 532 of the hydraulic cylinder of the actuator 434a that acts on the piston 530, the valve element 700 can be moved (in response to the differential fluid pressure) against the valve seat 702 to inhibit fluid flow from the actuator 434a to the pump 502.

While the above-described hydraulic circuits have been described as utilizing a hydraulic fluid, it will be appreciated that the teachings of the present disclosure have application to other types of control circuits, including pneumatic control circuits. Accordingly, it will be understood that the present disclosure will not be limited to systems that employ a hydraulic (i.e., incompressible) fluid, but will also extend to systems that employ compressible fluids, such as air.

In FIG. 8, a portion of an exemplary controller 560 that is compatible with the embodiments of FIGS. 4 through 6 is schematically illustrated. The controller 560 in the particular example provided is configured to receive a single, low-side control signal and to responsively operate a pair of solenoid-operated valves in a coordinated manner as will be described in more detail below. The controller 560 can include a control circuit 800, a first relay 802, a timer 804 and a second relay 806. The control circuit 800 can generate a control signal that can cause the operation of the first relay 802 and initiate operation of the timer 804. The second relay 806 can be operated upon expiration of a predetermined time interval in the timer 804.

Figure 9:
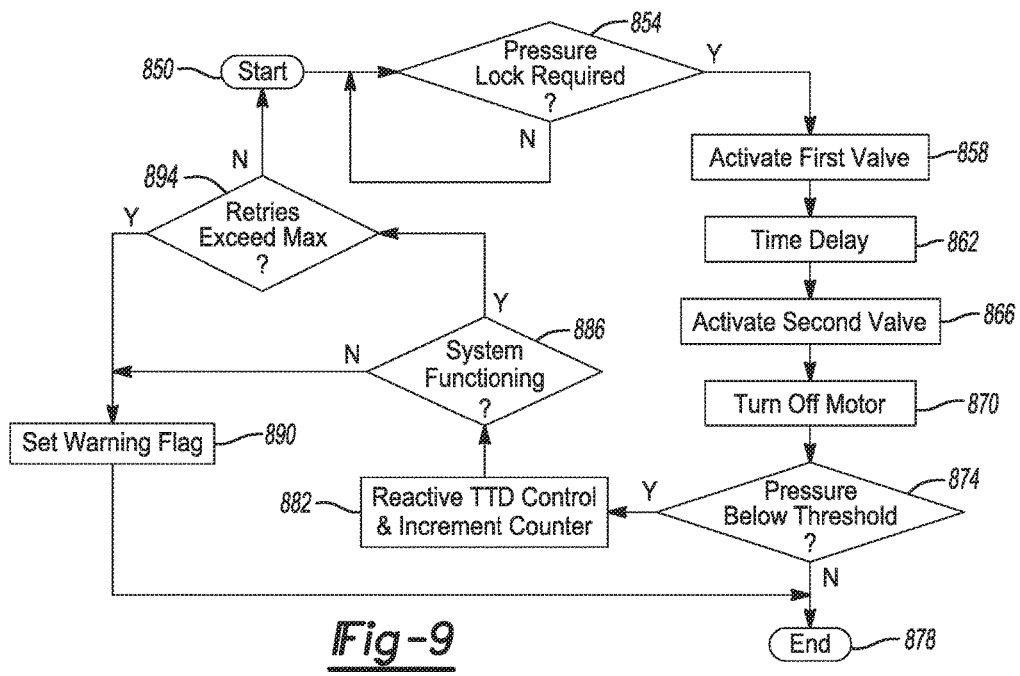
FIGS. 9 and 10 are schematic illustrations in flow chart form of methods for activating and de-activating, respectively, a pair of solenoid-operated valves in accordance with the teachings of the present disclosure.

In FIG. 9, an exemplary method for activating the pair of solenoid-operated valve in a coordinated manner in response to the receipt of a single, low-side control signal is schematically illustrated in flowchart form. The methodology begins at bubble 850 and proceeds to decision block 854 where control can determine if pressure locking the hydraulic cylinder is desired. If pressure locking the hydraulic cylinder is not desired, control can loop back to bubble 850. Returning to decision block 854, if pressure locking the hydraulic cylinder is desired, control can proceed to block 858, where the control circuit 800 (FIG. 8) can generate a signal that can cause the actuation of the first valve (i.e., movement of the valve body of the first valve to its second position). Control can proceed to block 862.

In block 862, control can initiate operation of the timer 804 (FIG. 8) to create a time delay of a predetermined duration. Upon the expiration of the predetermined time delay, control can proceed to block 866, where the control circuit 800 (FIG. 8) can generate a signal that can cause the actuation of the second valve (i.e., movement of the valve body of the second valve to its second position). Control can proceed to block 870 where the control circuit 800 (FIG. 8) can generate a signal that can halt the operation of the motor 500 (FIG. 4). Control can proceed to decision block 874.

In decision block 874, control can determine whether the pressure of the fluid acting on the piston 530 (FIG. 4) in the housing 532 (FIG. 4) of the hydraulic cylinder is below a first predetermined pressure threshold. If the pressure of the fluid acting on the piston 530 (FIG. 4) in the housing 532 (FIG. 4) of the hydraulic cylinder is not below the first predetermined pressure threshold, control can proceed to bubble 878 where control can end. Returning to decision block 874, if the pressure of the fluid acting on the piston 530 (FIG. 4) in the housing 532 (FIG. 4) of the hydraulic cylinder is below the first predetermined pressure threshold, control can proceed to block 882, to re-activate control for coupling the torque transfer device and to increment a first fault counter. The control for coupling the torque transfer device can cause operation of the motor 500 (FIG. 4), as well as deactivation of the first valve (i.e., movement of the valve body of the first valve to its first position) and deactivation of the second valve (i.e., movement of the valve body of the second valve to its first position) in an attempt to raise the pressure of the fluid acting on the piston 530 (FIG. 4) in the housing 532 (FIG. 4) of the hydraulic cylinder to a pressure that is above the first predetermined pressure threshold. Control can proceed to decision block 886.

In decision block 886, control can determine if the system is functioning. For example, control can determine that the system is functioning if the pressure of the fluid acting on the piston 530 (FIG. 4) in the housing 532 (FIG. 4) of the hydraulic cylinder is greater than or equal to the first predetermined pressure threshold. If control determines that the system is not functioning (e.g., the pressure of the fluid acting on the piston 530 (FIG. 4) in the housing 532 (FIG. 4) of the hydraulic cylinder is not greater than or equal to the first predetermined pressure threshold), control can proceed to block 890, where a warning flag or fault can be set. Control can proceed to bubble 878 where control can end.

Returning to decision block 886, if control determines that the system is functioning (e.g., the pressure of the fluid acting on the piston 530 (FIG. 4) in the housing 532 (FIG. 4) of the hydraulic cylinder is greater than or equal to the first predetermined pressure threshold), control can proceed to decision block 894, where control can determine if the value of the first counter exceeds a predetermined maximum (activation retry) threshold. If the value of the first counter exceeds the predetermined (activation retry) threshold, control can proceed to block 890. Returning to decision block 894, if control determines that the value of the first counter does not exceed the predetermined maximum (activation retry) threshold, control can proceed to bubble 850.

Figure 10:
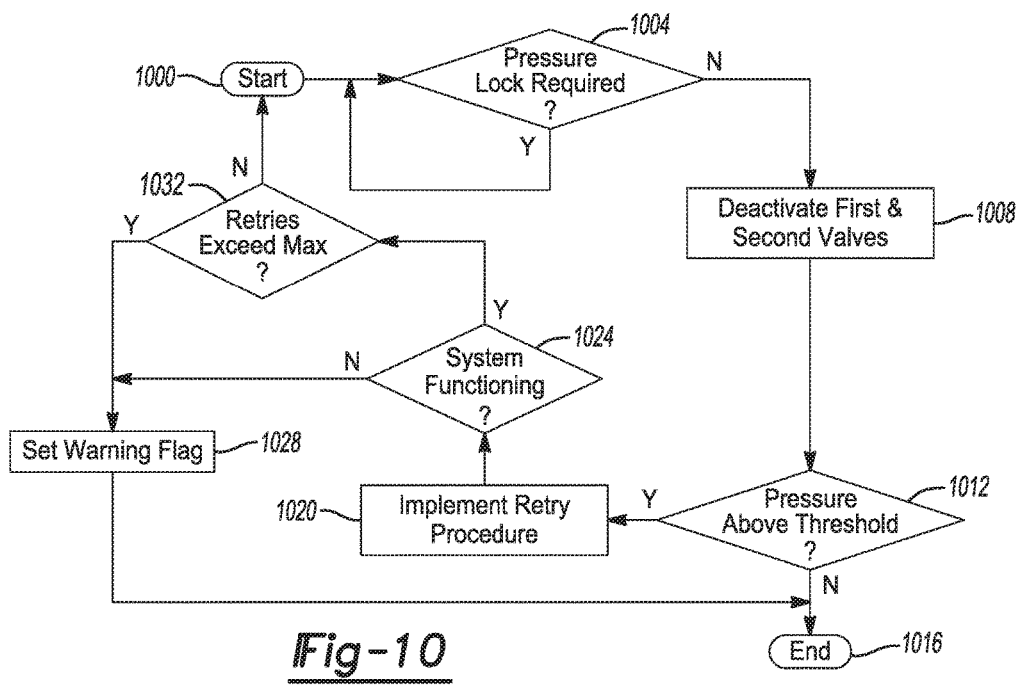

In FIG. 10, an exemplary method for deactivating the pair of solenoid-operated valve in a coordinated manner in response to the receipt of a single, low-side control signal is schematically illustrated in flowchart form. The methodology begins at bubble 1000 and proceeds to decision block 1004 where control can determine if pressure locking the hydraulic cylinder is desired. If pressure locking the hydraulic cylinder is desired, control can loop back to bubble 1000. Returning to decision block 1004, if pressure locking the hydraulic cylinder is not desired, control can proceed to block 1008, where the control circuit 800 (FIG. 8) can generate one or more signals that can cause the deactivation of the first valve (i.e., movement of the valve body of the first valve to its first position) and the deactivation of the second valve (i.e., movement of the valve body from its first position). The first and second valves can be de-activated simultaneously, or can be staged in a desired manner. In the particular example provided, the signal for de-activating the second valve is generated after the elapse of a predetermined time delay that is initiated after the signal for de-activating the first valve is generated. The time delay between the generation of the signals for de-activating the first and second valves can be equal to or different from the time delay that is employed between the generation of the signals for activating the first and second valves. In the particular example provided, a time delay of two miliseconds is used between the generation of the signals for de-activating the first and second valves, and a time delay of 50 miliseconds is used between the generation of the signals for activating the first and second valves. Control can proceed to decision block 1012.

In decision block 1012, control can determine whether the pressure of the fluid acting on the piston 530 (FIG. 4) in the housing 532 (FIG. 4) of the hydraulic cylinder is below a second predetermined pressure threshold. If the pressure of the fluid acting on the piston 530 (FIG. 4) in the housing 532 (FIG. 4) of the hydraulic cylinder is below the second predetermined pressure threshold, control can proceed to bubble 1016 where control can end. Returning to decision block 1012, if the pressure of the fluid acting on the piston 530 (FIG. 4) in the housing 532 (FIG. 4) of the hydraulic cylinder is not below the second predetermined pressure threshold, control can proceed to block 1020 to implement a retry procedure for unlocking the hydraulic cylinder and to increment a second fault counter. The retry procedure for unlocking the hydraulic cylinder can operate the first and second valves in a desired manner in an attempt to move their valve bodies and ultimately to permit their valve bodies to return to their first positions. Control can proceed to decision block 1024.

In decision block 1024, control can determine if the system is functioning. For example, control can determine that the system is functioning if the pressure of the fluid acting on the piston 530 (FIG. 4) in the housing 532 (FIG. 4) of the hydraulic cylinder is less than or equal to the second predetermined pressure threshold. If control determines that the system is not functioning (e.g., the pressure of the fluid acting on the piston 530 (FIG. 4) in the housing 532 (FIG. 4) of the hydraulic cylinder is greater than the second predetermined pressure threshold), control can proceed to block 1028, where a warning flag or fault can be set. Control can proceed to bubble 1016 where control can end Returning to decision block 1024, if control determines that the system is functioning (e.g., the pressure of the fluid acting on the piston 530 (FIG. 4) in the housing 532 (FIG. 4) of the hydraulic cylinder is less than or equal to the second predetermined pressure threshold), control can proceed to decision block 1032, where control can determine if the value of the second fault counter exceeds a predetermined maximum (deactivation retry) threshold. If the value of the second counter exceeds the predetermined (deactivation retry) threshold, control can proceed to block 1024. Returning to decision block 1032, if control determines that the value of the second counter does not exceed the predetermined maximum (deactivation retry) threshold, control can proceed to bubble 1028. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline comprising:
    a clutch having a plurality of first clutch plates and a plurality of second clutch plates that are interleaved with the first clutch plates;
    a reservoir configured to hold hydraulic fluid;
    a hydraulic ram coupled to the clutch, the hydraulic ram having a piston chamber and a piston that is movable in the piston chamber between a first position which is retracted relative to the first and second clutch plates, and a second position in which the piston is extended toward the first and second clutch plates to a greater extent than when the piston is in the first position;
    a first valve coupled for fluid communication with the piston chamber;
    a second valve coupled for fluid communication with the piston chamber, and the reservoir; and
    a pump configured to pump hydraulic fluid from the reservoir to the piston chamber via the first valve;
    wherein the first valve is operable in a first position, in which fluid communication is permitted between the pump and the piston chamber, and a second position in which fluid communication between the pump and piston chamber is prevented, wherein the first valve is switched between the first and second positions by a solenoid;
    wherein the second valve is operable in a first position, in which fluid communication is permitted between the piston chamber and the reservoir, and a second position in which fluid communication is permitted from the piston chamber to the reservoir but prevented from the reservoir to the piston chamber; and
    wherein the second valve is configured to be in the first position when a pressure within the piston chamber is less than a predetermined pressure, and the second valve is configured to be in the second position when the pressure in the piston chamber is greater than the predetermined pressure.

2. The vehicle driveline of claim 1, further comprising:
    a sensor configured to sense the pressure within the piston chamber and responsively output a signal; and
    a controller configured to receive the signal from the sensor and switch the first valve to the second position when the sensed pressure within the piston chamber is greater than the predetermined pressure.

3. The vehicle driveline of claim 2, wherein the controller is configured to switch the second valve to the second position when the sensed pressure within the piston chamber is greater than the predetermined pressure.

4. The vehicle driveline of claim 1, further comprising:
    a sensor configured to sense the pressure within the piston chamber and responsively output a signal; and
    a controller configured to receive the signal from the sensor and switch the second valve to the second position when the sensed pressure within the piston chamber is greater than the predetermined pressure.

5. The vehicle driveline of claim 1, further comprising a flow restricting element configured to restrict through the second valve when the second valve is in the first position.

6. The vehicle driveline of claim 1, wherein the pump has a first inlet and outlet and a second inlet and outlet, wherein the first valve is fluidly coupled between the reservoir and the first inlet and outlet of the pump, and the second inlet and outlet of the pump is fluidly coupled to the piston chamber.

7. The vehicle driveline of claim 1, wherein the pump has a first inlet and outlet and a second inlet and outlet, wherein the first valve is fluidly coupled between the second inlet and outlet of the pump and the piston chamber, and the first inlet and outlet of the pump is fluidly coupled to the reservoir.

* * * * *